US011383644B2

(12) United States Patent
Witte

(10) Patent No.: US 11,383,644 B2
(45) Date of Patent: Jul. 12, 2022

(54) DISPLAY SYSTEM AND METHOD FOR A VEHICLE

(71) Applicant: Ningbo Geely Automobile Research & Development Co., Ltd., Ningbo (CN)

(72) Inventor: Markus Witte, Torslanda (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/833,611

(22) Filed: Mar. 29, 2020

(65) Prior Publication Data

US 2020/0223362 A1  Jul. 16, 2020

Related U.S. Application Data

(63) Continuation of application No. PCT/CN2018/109088, filed on Sep. 30, 2018.

(30) Foreign Application Priority Data

Oct. 5, 2017 (EP) .................................... 17194911

(51) Int. Cl.
*H04N 9/47* (2006.01)
*B60R 1/00* (2022.01)
(Continued)

(52) U.S. Cl.
CPC ............... *B60R 1/008* (2013.01); *B60R 1/00* (2013.01); *G06V 20/59* (2022.01); *G06V 40/10* (2022.01);
(Continued)

(58) Field of Classification Search
USPC .......................................................... 348/77
See application file for complete search history.

(56) References Cited

U.S. PATENT DOCUMENTS

| | | | |
|---|---|---|---|
| 2002/0003571 A1* | 1/2002 | Schofield ............ | B60R 11/0235 348/148 |
| 2010/0332229 A1 | 12/2010 | Aoyama et al. | |

(Continued)

FOREIGN PATENT DOCUMENTS

| | | |
|---|---|---|
| CN | 106274682 A | 1/2017 |
| CN | 106289305 A | 1/2017 |

(Continued)

OTHER PUBLICATIONS

International Search Report and Written Opinion from corresponding International Patent Application No. PCT/CN2018/109088, dated Jan. 11, 2019, 8 pages.

(Continued)

*Primary Examiner* — Nigar Chowdhury
(74) *Attorney, Agent, or Firm* — Tucker Ellis LLP

(57) ABSTRACT

A display method and a display system for a vehicle includes a display unit, a camera unit, a processing circuitry connected to the display unit and the camera unit configured to cause the display system to determine, by the processing circuitry, the passenger of interest out of at least one passenger present in the vehicle, provide, by the camera unit, the image view of the passenger of interest, and display, by the display unit the image view of the passenger of interest on the display unit.

10 Claims, 3 Drawing Sheets

(51) Int. Cl.
  *H04N 5/225* (2006.01)
  *G06V 20/59* (2022.01)
  *G06V 40/10* (2022.01)
  *G06V 40/16* (2022.01)
  *G06V 40/20* (2022.01)

(52) U.S. Cl.
  CPC .............. *G06V 40/16* (2022.01); *G06V 40/20* (2022.01); *H04N 5/2253* (2013.01); *B60R 2300/10* (2013.01); *B60R 2300/20* (2013.01); *B60R 2300/8006* (2013.01)

(56) References Cited

U.S. PATENT DOCUMENTS

| | | | | |
|---|---|---|---|---|
| 2014/0214424 | A1* | 7/2014 | Wang | G10L 15/22 704/246 |
| 2014/0361522 | A1* | 12/2014 | Breed | B60R 21/30 280/738 |
| 2015/0048230 | A1* | 2/2015 | Satterfield | F16M 11/126 248/278.1 |
| 2015/0125126 | A1* | 5/2015 | Dreuw | B60K 28/066 386/226 |
| 2015/0206535 | A1* | 7/2015 | Iwai | G10L 15/25 704/231 |
| 2015/0380970 | A1* | 12/2015 | Vu | H02J 50/10 320/108 |
| 2016/0029111 | A1* | 1/2016 | Wacquant | H04R 3/005 381/86 |
| 2016/0071526 | A1* | 3/2016 | Wingate | G01S 3/807 704/233 |
| 2016/0082888 | A1 | 3/2016 | Kothari | |
| 2017/0026764 | A1* | 1/2017 | Rajendran | H03G 3/32 |
| 2017/0034454 | A1 | 2/2017 | Sawada | |
| 2017/0054949 | A1 | 2/2017 | Shaw | |
| 2017/0066375 | A1* | 3/2017 | Kato | H04N 7/181 |
| 2017/0300162 | A1* | 10/2017 | Jang | B60K 37/00 |
| 2017/0313248 | A1* | 11/2017 | Kothari | H04N 5/247 |
| 2017/0334357 | A1* | 11/2017 | Lewis | G06T 7/11 |
| 2017/0370744 | A1* | 12/2017 | Miyajima | G01C 21/343 |
| 2018/0052494 | A1* | 2/2018 | Coburn | B60N 2/002 |
| 2018/0129467 | A1* | 5/2018 | Gage | B60N 2/002 |

FOREIGN PATENT DOCUMENTS

| | | |
|---|---|---|
| CN | 106985750 A | 7/2017 |
| KR | 20130036492 A | 4/2013 |
| WO | 2017034282 A1 | 3/2017 |

OTHER PUBLICATIONS

Extended European Search Report from corresponding European Application No. 17194911.8, dated Mar. 23, 2018, 8 pages.

* cited by examiner

DISPLAY SYSTEM AND METHOD FOR A VEHICLE

RELATED APPLICATION DATA

This application is a continuation of International Patent Application No. PCT/CN2018/109088, filed Sep. 30, 2018, which claims the benefit of European Patent Application No. 17194911.8, filed Oct. 5, 2017, the disclosures of which are incorporated herein by reference in their entireties.

TECHNICAL FIELD

The disclosure pertains to the field of display systems for vehicles.

BACKGROUND

Today it is common that plural people travel together in the same vehicle. Commonly a vehicle, such as a car, have plural occupants, usually one driver or operator, and one or more passengers. A common use case is a family with children but also friends and colleagues that travel together. The way a driver communicates with passengers, other than the one in the front seat, is often to use the rear-view mirror in order to see the passenger that the driver is talking to. This can sometimes be a bit difficult since the rear-view mirror is not always mirroring all the passengers, and some passengers may be more or less visible in the rear-view mirror. An alternative for the driver is to turn around and look back at the passenger instead of keeping the eyes on the road. This maneuver can sometimes be a risk and can result in a traffic accident. It is said that only a few seconds of non-attention to the traffic by the driver is often the cause of a majority of all road accidents that occur.

SUMMARY

Today there is a demand for a better, more convenient and more safe way for a driver to see passengers in a vehicle. The driver of a vehicle must be able to keep the attention to the traffic and not turn around towards passengers in the vehicle, or move the head to an inconvenient position in order to see a person in the rear-view mirror.

An object of the present disclosure is to provide a system and method which seek to mitigate, alleviate, or eliminate one or more of the above-identified deficiencies in the art and disadvantages singly or in any combination.

The disclosure proposes a display system for a vehicle comprising a display unit arranged to display a passenger of interest to at least one occupant of the vehicle, a camera unit arranged to provide an image view of the passenger of interest to the display unit. The display system further comprising a processing circuitry, connected to the display unit and the camera unit, configured to cause the display system to determine, by the processing circuitry, the passenger of interest out of at least one passenger present in the vehicle, provide, by the camera unit, the image view of the passenger of interest, and display, by the display unit, the image view of the passenger of interest on the display unit. An advantage with the system is that an occupant of a vehicle, e.g. an operator or a driver of a car, can easily view the passenger of interest in display unit and at the same time maintain focus on the traffic ahead.

According to an aspect the processing circuitry is configured to cause the display system to detect at least one passenger parameter associated to the at least one passenger and determine the passenger of interest based on the detected passenger parameter. In this way a passenger can be detected and the image view of that passenger can be displayed on the display unit. Another advantage is that a certain passenger out of plural passengers, can be detected by using a passenger parameter.

According to an aspect the processing circuitry is configured to cause the display system to compare the passenger parameter with a predetermined criteria and determine the passenger of interest based on which passenger parameter matches the predetermined criteria. An advantage with comparing the passenger parameter with a predetermined criteria is that for example a certain behaviour of the passenger of interest can be filtered out and identify the passenger of interest in the vehicle.

According to an aspect the passenger parameter comprises sound and/or movement. In other words a certain sound and/or movement can be filtered out by comparing with a predetermined sound and/or movement.

According to an aspect the passenger parameter comprises face and/or lip recognition. Hence e.g. a face expression recognition and e.g. recognition of a certain lip movement, that can be an indication of that a passenger is talking, can be recognised to determine the passenger of interest.

According to an aspect the display unit is arranged to operate in a display mode, where the mirror display is a screen for viewing images, and in a mirror mode, where the mirror display is a mirror. In other words the display unit can function as an ordinary display, or alternate to function as a mirror.

According to an aspect the display unit is arranged to operate in both the display mode and the mirror mode simultaneously by operating at least a first part of the mirror display in the display mode for displaying at least one user of interest, and operating at least a second part of the mirror display in the mirror mode. This means the display unit can function as an ordinary display and at the same time function as a mirror.

According to an aspect the camera unit is a wireless camera unit that is wirelessly connected to the display unit. Hence a wireless camera unit can easily be placed without need for wires, but also a wireless camera unit can be an auxiliary device with a camera that is configured to operate with the display system.

The disclosure further proposes a display method for a vehicle, wherein the method comprising determining a passenger of interest out of at least one passenger present in the vehicle, providing an image view of the passenger of interest, and displaying the image view of the passenger of interest for at least one vehicle occupant. An advantage with the method is that an occupant of a vehicle, e.g. an operator or a driver of a car, can easily view the passenger in display unit and maintain focus on the traffic ahead.

According to an aspect method further comprising detecting at least one passenger parameter associated to the at least one passenger and determining the passenger of interest based on the detected passenger parameter. In this way a passenger can be detected and the image view of that passenger can be displayed on the display unit. Another advantage is that a certain passenger out of plural passengers, can be detected by using a passenger parameter.

According to an aspect method further comprising comparing the passenger parameter with a predetermined criteria and determining the passenger of interest based on which passenger parameter matches the predetermined criteria. An advantage with comparing the passenger parameter with a predetermined criteria is that for example a certain behaviour of the passenger of interest can be filtered out and identify the passenger of interest in the vehicle.

According to an aspect the passenger parameter comprises sound and/or movement. In other words a certain sound and/or movement can be filtered out by comparing with a predetermined sound and/or movement.

According to an aspect the passenger parameter comprises face and/or lip recognition. Hence e.g. a face expression recognition and e.g. recognition of a certain lip movement, that can be an indication of that a passenger is speaking, can be recognised to determine the passenger of interest.

According to an aspect the method comprising the step of displaying the image view of the passenger of interest for the at least one vehicle occupant on a display unit, which is a mirror display that is configured to operate in a display mode, where the mirror display is a screen for viewing images, and in a mirror mode, where the mirror display is a mirror. In other words the display unit can function as an ordinary display, or alternate to function as a mirror.

According to an aspect the method comprising the step of displaying the image view of the passenger of interest for the at least one vehicle occupant on a display unit, which is a mirror display that is configured to operate in both the display mode and the mirror mode simultaneously by operating at least a first part of the mirror display in the display mode for displaying at least one user of interest, and operating at least a second part of the mirror display in the mirror mode. This means the display unit can function as an ordinary display and at the same time function as a mirror.

BRIEF DESCRIPTION OF THE DRAWINGS

The foregoing will be apparent from the following more particular description of the example aspects, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
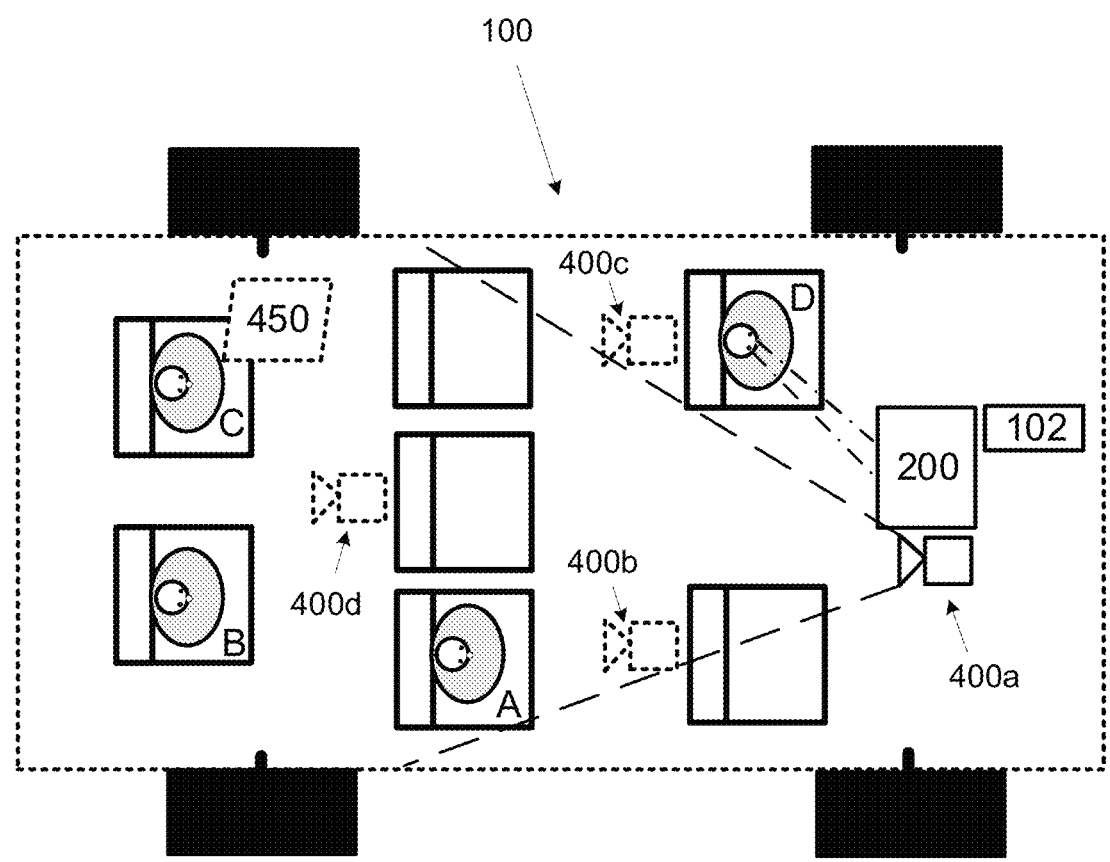
FIG. 1 illustrates a display system for implementing the proposed method.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Figure 2A:
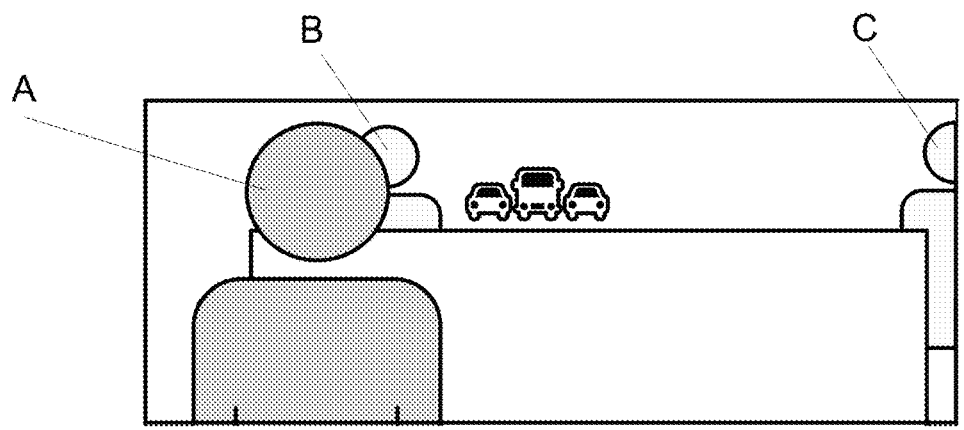
FIG. 2A illustrates a mirror view according to prior art.

Today it is common that plural people travel together in the same vehicle. The way a driver communicates with passengers, other than the one in the front seat, is often to use the rear-view mirror in order to see the passenger that the driver is talking to. A common rear-view mirror view according to prior art is illustrated in FIG. 2A. In FIG. 2A a driver of a vehicle typically see the traffic behind the vehicle and also at least part of the passengers in the vehicle. All the passengers may not be visible, and some passengers may be more or less visible in the rear-view mirror. One use case is that the driver changes the view angle of the rear-view mirror in order to see a certain passenger, but the change of the view angle sometimes makes it impossible to see the traffic or other passengers. An alternative for the driver is to turn around and look back at the passenger instead of keeping the eyes on the road ahead. This maneuver can sometimes be a risk and can result in a traffic accident. It is said that only a few seconds of non-attention to the traffic by the driver is often the cause of a majority of all road accidents that occur.

The inventor has identified that there is a need for a solution where a driver of a vehicle can easily see and communicate with all the passengers in the vehicle and at the same time keep an eye on the traffic.

The disclosure proposes a display system 100 as illustrated in FIG. 1 for a vehicle comprising a display unit 200 arranged to display a passenger of interest to at least one occupant of the vehicle. The display unit 200 can be any display device such as dedicated display unit, a dashboard display, a display of a portable device such as a smartphone or a tablet, a mirror display such as a rear-view or side mirror display, a Heads up display in the windscreen etc.

The display system 100 further comprise a camera unit 400*a*, 400*b*, 400*c*, 400*d* arranged to provide an image view of the passenger of interest to the display unit 200. The camera unit 400*a*, 400*b*, 400*c*, 400*d* is according to an aspect a dedicated camera unit 400*a* that is mounted adjacent to the display unit 200. According to an aspect the display system 100 comprise plural camera units 400*a*, 400*b*, 400*c*, 400*d*. The camera unit 400*a*, 400*b*, 400*c*, 400*d* can be placed so that the camera unit 400a, 400b, 400c, 400d capture an image view of a passenger in the vehicle. For example in FIG. 1 the camera unit 400b is positioned close to where the passenger A is sitting. The camera unit 400a, 400b, 400c, 400d can also be positioned to capture image view of plural, or one of plural passengers, in the vehicle. For example as illustrated in FIG. 1, the camera unit 400d is positioned in order to capture an image view of either both passenger B and C or one of the passengers B or C. The camera unit 400a is positioned so that all passengers in the vehicle can be captured.

According to an aspect the camera unit 400a, 400b, 400c, 400d is a wireless camera unit 450 that is wirelessly connected to the display unit 200. Hence the wireless camera unit can easily be positioned without need for wires, but also the wireless camera unit can be a separate device 450 with a camera that can operate with the display system 100. The display system 100 may be configured to connect to the wireless camera unit 450 that is an auxiliary wireless electronic device that can connect wirelessly to the display system 100. According to an aspect the wireless camera unit 450 is a smartphone that one of the passengers is using. According to an aspect the wireless camera unit 450 is a camera unit that is located in another vehicle. The wireless camera unit 450 may be connected to the display system 100 using a communication network. In this way the passengers of plural vehicles can be connected to the display system 100.

In one example the communication network is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network can also be a combination of both a local area network and a wide area network. The communication network can also be a wired network. According to some aspects of the disclosure the communication network is defined by common Internet Protocols.

The display system 100 further comprising a processing circuitry 102, connected to the display unit 200 and the camera unit 400a, 400b, 400c, 400d. The processing circuitry 102 can be a Central Processing Unit, CPU, or any processing unit carrying out instructions of a computer program or operating system. The processing circuitry 102 is configured to cause the display system 100 to determine, by the processing circuitry 102, the passenger of interest out of at least one passenger present in the vehicle, provide, by the camera unit 400a, 400b, 400c, 400d, the image view of the passenger of interest, and display, by the display unit 200, the image view of the passenger of interest on the display unit 200. An advantage with the display system 100 is hence that an occupant of a vehicle, e.g. a driver of a car, can easily view the passenger of interest in the display unit 200 and at the same time keep the focus on the traffic ahead.

According to an aspect the processing circuitry 102 is configured to cause the display system 100 to detect at least one passenger parameter associated to the at least one passenger and determine the passenger of interest based on the detected passenger parameter. In this way a passenger can be detected and the image view of that passenger can be displayed on the display unit. Another advantage is that a certain passenger out of plural passengers, can be detected by using a passenger parameter.

According to an aspect the processing circuitry 102 is configured to cause the display system 100 to compare the passenger parameter with a predetermined criteria and determine the passenger of interest based on which passenger parameter matches the predetermined criteria. An advantage with comparing the passenger parameter with a predetermined criteria is that for example a certain behaviour of the passenger of interest can be filtered out and identify the passenger of interest in the vehicle.

According to an aspect the passenger parameter comprises sound and/or movement. In other words a certain sound and/or movement can be filtered out by comparing with a predetermined sound and/or movement. In one aspect the camera unit 400a, 400b, 400c, 400d further comprise a microphone. The microphone can be a built in microphones in the camera unit 400a, 400b, 400c, 400d. The microphone can also be an auxiliary microphone connected to any unit of the display system 100. According to an aspect the camera unit 400a, 400b, 400c, 400d detects sound and/or movement. According to one aspect the display system 100 detects at least one passenger parameter that is sound and/or movement associated to the at least one passenger. According to an aspect the display system 100 determines the passenger of interest based on the detected passenger parameter e.g. by detecting sound when the passenger is talking. In one aspect the display system 100 determines the passenger of interest based on the detected passenger parameter e.g. by detecting a movement of the passenger.

According to an aspect the passenger parameter is compared with a predetermined criteria and determines the passenger of interest based on which passenger parameter matches the predetermined criteria. According to an aspect the predetermined criteria is a certain level of sound. According to an aspect the predetermined criteria is a certain level of movement. In the example where plural camera units 400a, 400b, 400c, 400d are used detection of sound and/or movement from each camera unit 400a, 400b, 400c, 400d is compared with a predetermined criteria and determine the passenger of interest based on which passenger parameter matches the predetermined criteria. In one example the one camera unit 400a, 400b, 400c, 400d detect a certain sound and/or movement that is different from the sound and/or movement from another camera unit 400a, 400b, 400c, 400d. This information can be used for determine the passenger of interest.

According to an aspect the passenger parameter comprises face and/or lip recognition. Hence e.g. a face expression recognition and e.g. recognition of a certain lip movement, that can be an indication of that the passenger is talking, can be recognised to determine the passenger of interest. In one example the processing circuitry 102 is configured to cause the display system 100 to detect at least one passenger parameter that is a face detection parameter associated to the at least one passenger and determine the passenger of interest based on the detected passenger parameter. Face recognition parameters can for example be data associated with e.g. measurement of a human face, such as distances between eyes and other data that relate to general face gestures but also data that relate to identification of a certain person. In one example face recognition is used to detect if the passenger is silent or talking. In one example the face recognition is used for identifying the passenger of interest and the predetermined criteria can then for example be image data of the passenger that is available to the display system 100 and used as the predetermined criteria. In one example the person of interest can be pre-selected by predetermined criteria in form of image data of a certain passenger. In one example face recognition can be used to detect where a passenger is located. In one example lip recognition is can be used to detect where a passenger is located. The location data can be used for e.g. zooming in on the face of the passenger of interest by the camera unit 400a, 400b, 400c, 400d. In one example lip recognition is used for detecting if a passenger silent or talking.

According to an aspect the processing circuitry 102 is configured to cause the display system 100 to compare the passenger parameter, wherein the passenger parameter comprises face and/or lip recognition, with predetermined criteria and determine the passenger of interest based on which passenger parameter matches the predetermined criteria. In one example the predetermined criteria is a certain lip movement, reflecting the movement of the lips when a person is talking.

According to an aspect the processing circuitry 102 is configured to cause the display system 100 to determine the passenger of interest out of at least one passenger present in the vehicle and automatically display, by the display unit 200, the image view of the passenger of interest on the display unit 200.

According to an aspect the processing circuitry 102 is configured to cause the display system 100 to determine the passenger of interest out of at least one passenger present in the vehicle and prompt an occupant of the vehicle that the passenger of interest is determined, and display, by the display unit 200, the image view of the passenger of interest on the display unit 200 after receiving input from the occupant accepting the passenger of interest to be displayed by the display unit 200.

According to one aspect, the display unit 200 comprise a so called touch display that receive input from the occupant. In one example the touch display is used for controlling the display system 100. In one example the touch display is used for manually zooming in on the passenger of interest. According to one aspect, the display system 100 suggests the passenger of interest to the occupant that thereafter can approve or disapprove the passenger of interest suggested by the display system 100. According to one aspect the display system 100 comprise a user interface for operation and control by input/output of information to/from the occupant of the vehicle to control the display system. In one example the display system is a stand-alone system that can be installed in any vehicle. In one example the display system 100 is a part of a vehicle's pre-installed original equipment. The processing circuitry 102 is in one example the processing circuitry 102 of the vehicle. The display unit 200 is in one example the original rear-view mirror display.

Figure 2B:
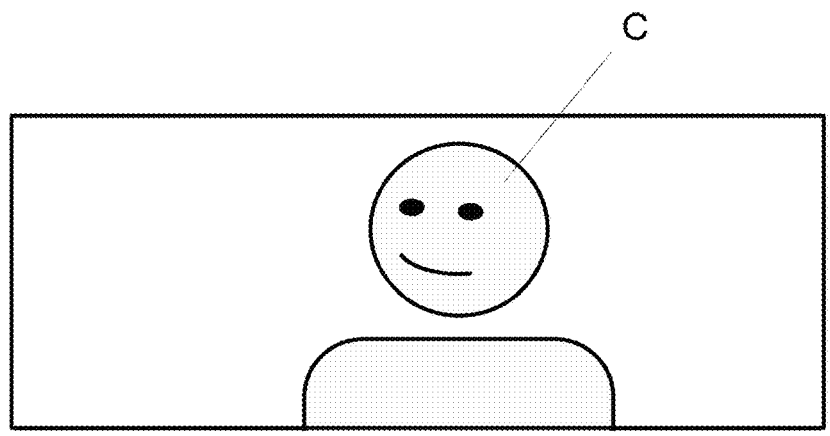
FIG. 2B illustrates a an exemplary image view of the passenger of interest according to an aspect of the disclosure.

According to an aspect the display unit 200 is a mirror display 200 that is arranged to operate in a display mode, where the mirror display 200 is a screen for viewing images, and in a mirror mode, where the mirror display 200 is a mirror. In other words the display unit 200 can functions as an ordinary display, or alternate to function as an ordinary mirror. The mirror display 200 comprise according to an aspect a build-in LCD display that is displaying images from the camera unit 400a that has a mirror glass mounted in front of the LCD display. The effect is that when the LCD-display is on and displays images, the mirror glass is transparent to the driver but when the LDC-display is turned off, and un-lit, the mirror glass in front of the LCD-display appears as a normal mirror for the driver. This means that when e.g. power supply is turned off to the LCD-display, the mirror display functions as a normal mirror. In one aspect with the possibility to shift operation between mirror mode and display mode is that the driver can at anytime manually or automatically turn off the LCD-display to enter normal mirror mode for a safety reason, so that the driver e.g. can observe the traffic in the mirror mode. The illustration in FIG. 2A is an example view of mirror mode, which hence is the similar view of an ordinary mirror according to prior art, and the illustration in FIG. 2B is an example view of display mode.

Figure 2C:
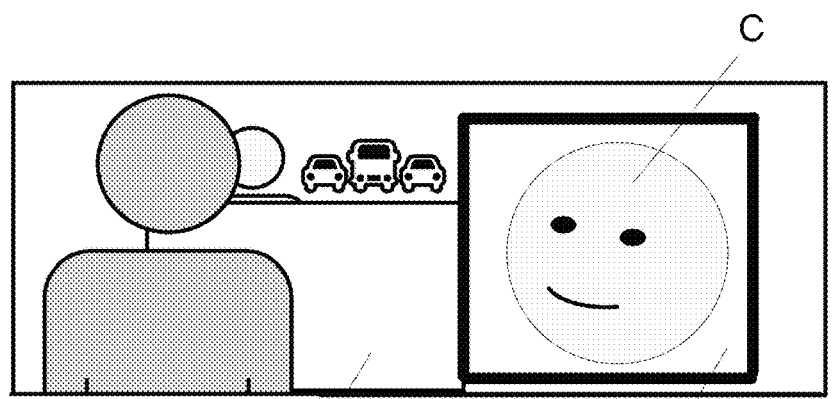
FIG. 2C illustrates an exemplary image view of the passenger of interest according to an aspect of the disclosure.

According to an aspect the mirror display 200 is arranged to operate in both the display mode and the mirror mode simultaneously by operating at least a first part 210 of the mirror display 200 in the display mode for displaying at least one user of interest, and operating at least a second part 220 of the mirror display 200 in the mirror mode. This means the display unit 200 can function as an ordinary display and at the same time function in the mirror mode. The illustration in FIG. 2C illustrates a display unit 200 that is operating in both display mode and mirror mode simultaneously. Person C is in the example zoomed in and displayed in the first part 210 of the display unit 200 that is operating in display mode, while the second part 220 of the display unit 200 is operating in mirror mode, showing at least part of the other passengers, and the traffic behind the vehicle. The display unit 200 is according to an aspect adapted to optimise the view of the traffic behind the vehicle in the mirror mode and at the same time optimise the part that is operating in display mode in order to facilitate the display unit 200 that is adapted for safe driving and social communication with passengers in the vehicle.

Figure 3:
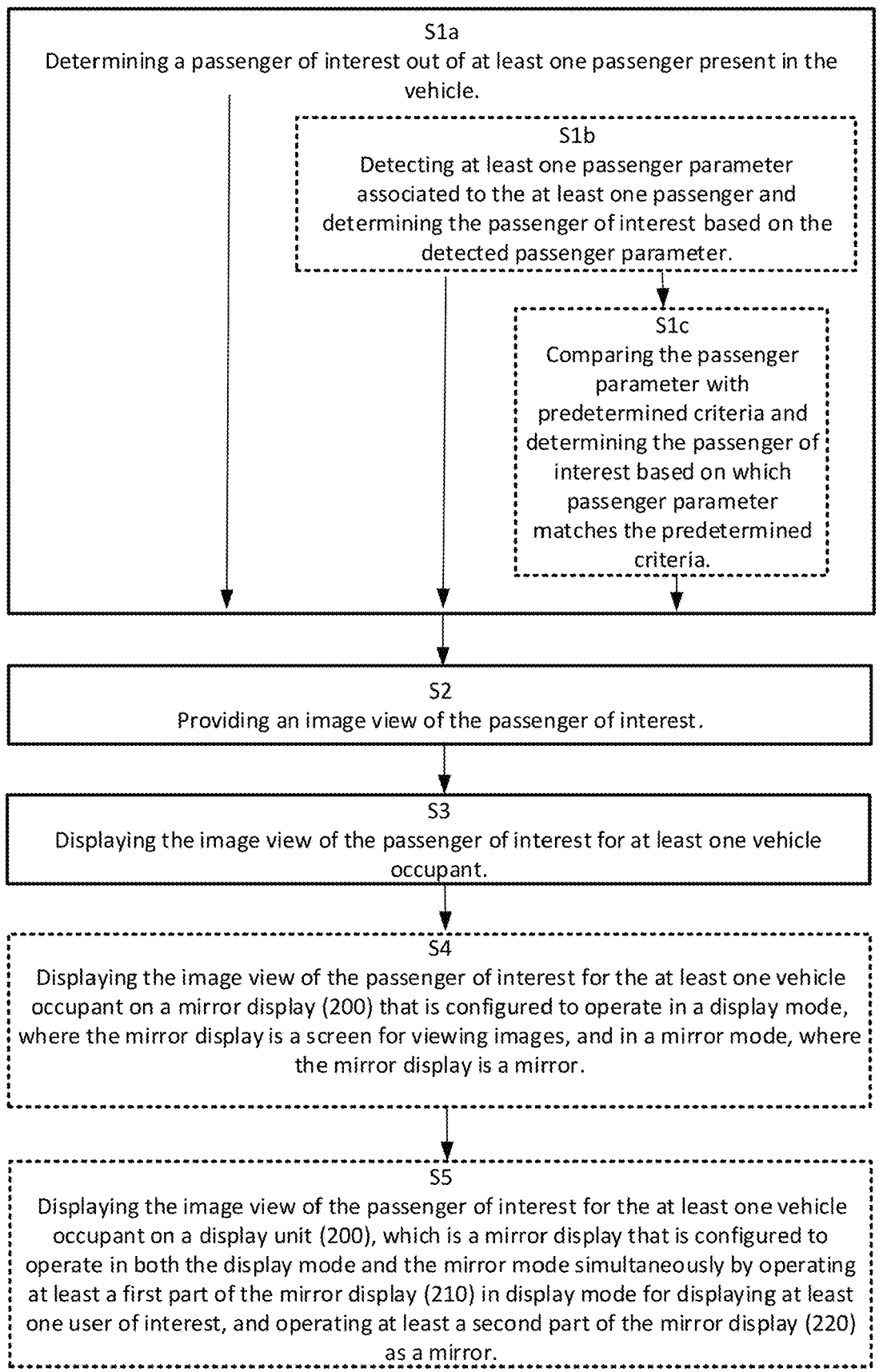
FIG. 3 illustrates a flow chart of the method steps according to some aspects of the disclosure.

With reference to FIG. 3 the disclosure further proposes a display method. The display system 100 is adapted for carrying out the display method. Aspects of the display system 100 described above can be carried out by the display method described below.

The disclosure proposes the display method for the vehicle, wherein the method comprising S1a determining the passenger of interest out of at least one passenger present in the vehicle, S2 providing an image view of the passenger of interest, and S3 displaying the image view of the passenger of interest for at least one vehicle occupant. An advantage with the method is that the occupant of a vehicle, e.g. the driver of a car, can easily view the passenger of interest in the display unit and maintain focus on the traffic ahead.

According to an aspect the method further comprising S1b detecting at least one passenger parameter associated to the at least one passenger and determining the passenger of interest based on the detected passenger parameter. In this way the passenger can be detected and the image view of that passenger can be displayed on the display unit 200. Another advantage is that a certain passenger out of plural passengers, can be detected by using a passenger parameter.

According to an aspect method further comprising S1c comparing the passenger parameter with a predetermined criteria and determining the passenger of interest based on which passenger parameter matches the predetermined criteria. An advantage with comparing the passenger parameter with a predetermined criteria is that for example a certain behaviour of the passenger of interest can be filtered out and identify the passenger of interest in the vehicle.

According to an aspect the passenger parameter comprises sound and/or movement. In other words a certain sound and/or movement can be filtered out by comparing with a predetermined sound and/or movement.

According to an aspect the passenger parameter comprises face and/or lip recognition. Hence e.g. a face expression recognition and e.g. recognition of a certain lip movement, that can be an indication of that a passenger is speaking, can be recognised to determine the passenger of interest.

According to an aspect the method comprising the step S4 of displaying the image view of the passenger of interest for the at least one vehicle occupant on the mirror display 200 that is configured to operate in the display mode, where the mirror display is a screen for viewing images, and in the mirror mode, where the mirror display 200 is a mirror. In other words the display unit 200 can function as an ordinary display, or alternate to function in the mirror mode.

According to an aspect the method comprising the step of S5 displaying the image view of the passenger of interest for the at least one vehicle occupant on the mirror display 200 that is configured to operate in both the display mode and the mirror mode simultaneously by operating at least the first part of the mirror display 210 in the display mode for displaying at least one user of interest, and operating at least the second part of the mirror display 220 in the mirror mode. This means the display unit 200 can function as an ordinary display and at the same time function in the mirror mode.

The use of the display system 100 and the display method will now be described with the following use cases:

In one use case, illustrated in FIG. 1, a vehicle, equipped with the display system 100, has four occupants; three passengers A, B and C, and an operator, i.e. the driver, D. The driver D is monitoring the passengers via the display unit 200 that is a rear-view display mirror. The camera unit 400*a* has a camera view angle that captures all three passengers; A, B and C. The display system 100 determine the passenger of interest based on a detected passenger parameter being speech. In the example passengers A and B are both silent while passenger C is talking. The display system 100 has detected the passenger of interest is the passenger C, that is talking, and the camera unit 400*a* zooms in on passenger C and displays the image view of passenger C on the display unit 200 to the driver. In the display unit 200, the passenger C is in close-up, preferably zooming in on the face of the passenger C as illustrated in FIG. 2B. The driver of the vehicle can then see passenger C on the display unit 200. In one example the passenger C is displayed for the at least one vehicle occupant on the display unit 200, that is the mirror display 200 that is configured to operate in both the display mode and the mirror mode simultaneously by operating at least the first part 210 of the mirror display 200 in the display mode for displaying at least one user of interest, C, and operating at least the second part 200 of the mirror display 200 in the mirror mode. This example is illustrated in FIG. 2C.

In one use case the passenger C is using a tablet that is wirelessly connected to the display system 100. The tablet has a built-in video camera that is configured for capturing an image of the face of passenger C. The passenger C is determined as the passenger of interest and the display system detects the passenger C via the camera unit 400*a* and via the tablet that is the wireless camera unit 450 as illustrated in FIG. 1. According to an aspect the display system 100 is configured to detect the best image view of plural image views provided by plural camera units 400*a*, 400*b*, 400*c*, 400*d*. According to an aspect the display system 100 is configured to detect the best image view of plural image views provided by plural camera units 400*a*, 400*b*, 400*c*, 400*d* and wireless camera unit 450.

In one use case the passenger A is playing a game, e.g. a karaoke game, with passenger C, illustrated in FIG. 1. The passenger C is determined as the passenger of interest and the display system 100 detects the passenger C via the camera unit 400*d*. The display system 100 has detected that the passenger of interest is the passenger C, that is singing, and the camera unit 400*d* zooms in on passenger C and displays the image view of passenger C on the display unit 200 that then can be seen by passenger A. When it is passenger A's turn to sing in the karaoke game, the display system 100 detects the passenger A as the passenger of interest via the camera unit 400*b* and the camera unit 400*b* zooms in on passenger A and displays the image view of passenger A on the display unit 200 that then now can be seen by passenger C.

According to an aspect of the disclosure, the method is carried out by instructions in a software program that is downloaded and run in the display system.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

What is claimed is:

1. A display system for a vehicle comprising:
a display unit arranged to display an image view of a passenger of interest to an occupant of the vehicle, and
a processing circuitry, connected to the display unit and configured to determine the passenger of interest out of passengers present in the vehicle that have smartphones in the vehicle,
wherein the display system is configured to wirelessly communicate with the smartphones of the passengers and receive video of the respective passengers from camera units of the smartphones, and the processing circuitry is further configured to cause the display system to:
determine the passenger of interest by conducting face and/or lip recognition on the received video of the respective passengers,
prompt the occupant of the vehicle that the passenger of interest is determined, and
display, by the display unit, the image view of the passenger of interest on the display unit after receiving input from the occupant of the vehicle accepting display of the passenger of interest, the displayed image view being received from the camera unit of the smartphone of the passenger of interest.

2. The display system according to claim 1, wherein the processing circuitry is configured to cause the display system to compare a passenger parameter of each passenger with a predetermined criteria and determine the passenger of interest based on which passenger parameter matches the predetermined criteria.

3. The display system according to claim 2, wherein the passenger parameter of each passenger comprises at least one of sound or movement.

4. The display system according to claim 1, wherein the display unit is a mirror display that is operative in a display mode in which the mirror display is a screen for viewing images, and in a mirror mode in which the mirror display is a mirror.

5. The display system according to claim 4 wherein the display unit is a mirror display that is operative in both the display mode and the mirror mode simultaneously by operating at least a first part of the mirror display in the display mode for displaying at least one user of interest, and operating at least a second part of the mirror display in the mirror mode.

6. A display method for a vehicle, the method comprising:
  determining a passenger of interest out of passengers present in the vehicle that have smartphones in the vehicle, the determining including wirelessly communicating with the smartphones of the passengers and receiving video of the respective passengers from camera units of the smartphones, and conducting face and/or lip recognition on the received video of the respective passengers to determine the passenger of interest;
  prompting an occupant of the vehicle that the passenger of interest is determined;
  receiving input, from the occupant of the vehicle, to accept display of an image view of the passenger of interest; and
  displaying the image view of the passenger of interest after receiving the input to accept display of the passenger of interest, the displayed image view being received from the camera unit of the smartphone of the passenger of interest.

7. The method according to claim 6, further comprising comparing a passenger parameter of each passenger with a predetermined criteria and determining the passenger of interest based on which passenger parameter matches the predetermined criteria.

8. The method according to claim 7, wherein the passenger parameter of each passenger comprises at least one of sound or movement.

9. The method according to claim 6, wherein the step of displaying displays the image view of the passenger of interest on a mirror display that is operative in a display mode in which the mirror display is a screen for viewing images, and in a mirror mode in which the mirror display is a mirror.

10. The method according to claim 9, wherein the step of displaying displays the image view of the passenger of interest on the mirror display in both the display mode and the mirror mode simultaneously by operating at least a first part of the mirror display in the display mode for displaying the passenger of interest, and operating at least a second part of the mirror display in the mirror mode.

* * * * *